United States Patent Office 3,450,693
Patented June 17, 1969

3,450,693
METHOD OF SYNTHESIZING ADENOSINE, 2',3'-O-ISOPROPYLIDENE-ADENOSINE AND INTERMEDIATES THEREOF
Katsumi Suzuki, Tokyo, and Izumi Kumashiro, Yokohama-shi, Japan, assignors to Ajinomoto Co., Inc., Tokyo, Japan
No Drawing. Continuation-in-part of application Ser. No. 646,166, June 15, 1967. This application Mar. 12, 1968, Ser. No. 712,371
Claims priority, application Japan, June 18, 1966, 41/39,419
Int. Cl. C07d 57/36
U.S. Cl. 260—211.5                                    6 Claims

ABSTRACT OF THE DISCLOSURE

Adenosine may be synthesized from AICAR (5-amino-4-carbamoyl-1-$\beta$-D-ribofuranosyl-imidazole) by acetylation to protect the hydroxyl groups in position 2',3',5', followed by treatment with an acyl chloride in the presence of an organic base to convert the 4-carbamoyl group to a cyano group by dehydration, and closure of a pyrimidine ring by means of formamide or lower-alkyl orthoformate and ammonia. The acetyl groups are removed during ring closure or may be removed prior to ring closure. 2',3'-isopropylideneadenosine is prepared by analogous reactions from 2',3'-isopropylidene-AICAR.

REFERENCE TO RELATED APPLICATION

This application is a continuation-in-part of a copending application, Ser. No. 646,166, filed on June 15, 1967 and now abandoned.

BACKGROUND OF THE INVENTION

The present invention relates to a method of synthesizing adenosine, 2',3'-O-isopropylideneadenosine and intermediates thereof from the new compounds 5-amino-4-carbamoyl - 1 - (2',3',5'-tri-O-acetyl-$\beta$-D-ribofuranocyl)imidazole (which is referred to hereinafter as Tri-AcO-AICAR) or 5-amino-4-carbamoyl-1-(2',3'-O-isopropylidene-5'-O-acetyl-$\beta$-D-ribofuranosyl)imidazole (which is referred to as Ip-AcO-AICAR).

Adenosine and 2',3'-O-isopropylideneadenosine have recently been used in the field of medicine. (French Patent No. 153 M.)

SUMMARY OF THE INVENTION

According to the present invention adenosine and 2',3'-O-isopropylideneadenosine may be produced in a series of reactions involving synthesis of 5-amino-4-cyano-1-(2',3',5'-tri-O-acetyl-$\beta$-D-ribofuranosyl)imidazole (hereinafter referred to as Tri-AcO-AICNR) or 5-amino-4-cyano-1-(2',3' - O - isopropylidene-5'-O-acetyl-$\beta$-D-ribofuranosyl)-imidazole (hereinafter referred to as Ip-AcO-AICNR) and conversion of these intermediate compounds to adenosine or 2',3'-O-isopropylideneadenosine.

It has been found that Tri-AcO-AICAR or Ip-AcO-AICAR can be reacted with a dehydrating agent such as an acid chloride in the presence of an organic base to produce Tri-AcO-AICNR or Ip-AcO-AICNR in high yield.

The starting material of the present invention, Tri-AcO-AICAR may be easily produced by acylating 5-amino-4-carbamoyl-1-$\beta$-D-ribofuranosylimidazole (hereinafter referred to as AICAR) with acetic anhydride. The other starting material, Ip-AcO-AICAR may also be prepared by a similar acetylation of 2',3'-O-isopropylidene-AICAR (hereinafter referred to as Ip-AICAR: British Patent Specification No. 1,065,018).

Organic bases which can be used as catalysts in the present invention include tertiary lower alkylamines, such as trimethylamine, triethylamine or tri-n-butylamine, heterocyclic amines, such as pyridine and its lower-alkyl homologs lutidine, picoline or collidine, and strong basic ion exchange resin. The organic base is used in an amount of more than one mole per mole of the starting material.

Dehydrating agents which can be used in the present invention are acid chlorides, such as p-toluensulfonyl chloride, methanesulfonyl chloride, acetyl chloride, benzoyl chloride, thionyl chloride or carbobenzoxy chloride, and phosphorus halogenides, such as phosphoryl chloride, phosphorus trichloride or phosphorus pentachloride. The dehydrating agent is used in an amount of one to about three moles per mole of the starting material, preferably one and one half moles.

2,2-diethoxypropane or an orthoformate may also be present as a supplementary dehydrating agent to promote the reaction.

The dehydration reaction readily proceeds without solvent, but such solvents as chloroform, 1,1,1-trichloroethane, 1,1,2-trichloroethane, trimethylphosphate or triethylphosphate may also be present, if necessary. The reaction proceeds between $-10°$ C. and $+50°$ C., for example at room temperature, and no pressure is necessary. The time for completion of the reaction is about 30 minutes to 10 hours, although it varies with the amount of the reactants, the catalyst, and the reaction temperature.

The intermediate Tri-AcO-AICNR or Ip-AcO-AICNR is isolated by pouring the reaction mixture into ice-water to decompose unreacted dehydrating agent, extracting the water layer with a solvent not soluble in water, such as chloroform, and removing the solvent from the extract. The crude intermediate product may be purified by treatment with suitable solvents, such as methanol, ethanol or chloroform.

Paper chromatography of the product isolated gives a single spot, and no by-product can be found.

When Tri-AcO-AICNR or Ip-AcO-AICNR is reacted with formamide or orthoformate and ammonia to close a pyrimidine ring, adenosine or 2',3'-O-isopropylideneadenosine can be produced in high yield. According to the present invention, 5-amino-4-cyano-1-$\beta$-D-ribofuranosylimidazole (hereinafter referred to an AICNR) and 2',3'-O-isopropylidene-AICNR (hereinafter referred to as Ip-AICNR) can also be used as starting materials. AICNR may be prepared by hydrolyzing Tri-AcO-AICNR with ammonia. Ip-AICNR may be prepared by reacting Ip-AICAR with a dehydrating agent in the presence of an amine as in the above reactions, and may also be prepared from Ip-AcO-AICNR by hydrolysis with ammonia.

Formamide is used in amount of 5 to 30 moles per mole of the intermediate compound, and the reaction is carried out with heating, for example with refluxing or in a sealed tube. The reaction temperature is at the boiling point of the reaction system or between 90° and 250° C., preferably 100° and 180° C. The time required for completion of the reaction is 30 minutes to 5 hours.

The orthoformates which can be used in the present invention include the lower alkyl esters of orthoformic acid, such as methyl orthoformate, ethyl orthoformate or propyl orthoformate. The orthoformate is used in an amount of 1.2 moles to 5 moles with Tri-AcO-AICNR or Ip-AcO-AICNR, 2.4 moles to 10 moles with Ip-AICNR and 4.8 moles to 15 moles with AICNR.

Ammonia is used in an amount of 2 to 10 moles per mole of AICNR or its derivatives.

AICNR and its derivatives may be reacted with the orthoformate and ammonia simultaneously, or may be reacted first with orthoformate to form 4-cyano-5-alkoxymethylene- aminoimidazole ribofuranoside, and the furanoside, which may be isolated or not, is reacted with ammonia.

The simultaneous reaction is carried out at the boiling point of the reaction system or between 90° and 250° C., preferably 100° and 180° C. When the orthoformate and ammonia are separately reacted, the amination reaction is preferably performed under milder conditions than the preceding reaction, for example, the reaction mixture is stirred at room temperature for several hours. Although a solvent is not required, ammonia can be used as a saturated solution in a lower alkanol.

When AICNR, or Tri-AcO-AICNR is reacted with orthoformate and ammonia, the end product is adenosine, and when Ip-AICNR or Ip-AcO-AICNR is used, the end product is 2′,3′-O-isopropylideneadenosine.

The end product is recovered by evaporating unreacted orthoformate from the reaction mixture, and the residue may be recrystallized from a suitable solvent, such as water or aqueous alkanol.

According to the present invention, adenosine and 2′,3′-O-isopropylideneadenosine can be synthesized in a series of simple reactions from cheaply available AICAR on an industrial scale. Intermediates of the formula are formed during these reactions. In the formula, each R is hydrogen, acetyl, or propylidene jointly with the other R, and R′ is hydrogen or acetyl.

DESCRIPTION OF PREFERRED EMBODIMENTS

The preparation of certain starting materials used in the present invention is described below in Examples 1 to 3 for convenience of reference, but the preparation of the starting materials is not claimed as part of the present invention.

Example 1

Preparation of Tri-AcO-AICAR.—10.3 g. AICAR was added to a mixture of 14.7 g. acetic anhydride and 21.9 g. triethylamine, and the mixture was stirred at 50° C. for 4 hours. The reaction mixture was concentrated under reduced pressure, 80 ml. benzene was added to the residue obtained, and the crystals precipitated were collected by centrifuging. The crystals were recrystallized from a mixture of ethylacetate and benzene (1:1 volume per volume), and the pure crystals weighed 15.3 g., representing a yield of 81%. The crystals melted at 130–131° C.

An elementary analysis of the crystals was as follows: Found (percent): C, 46.64; H, 5.25; N, 14.61. Caculated for $C_{15}H_{20}O_9N_4$ (percent): C, 46.87; H, 5.25; N, 14.58.

Only a single spot of $Rf$ 0.64 was detected on a paper chromatogram of the crystals in a mixed solvent of n-butanol, acetic acid and water (4:1:1 volume per volume).

Ultraviolet absorption spectra of the crystals showed $\lambda_{max}$ 247 (S) and 270 m$\mu$ at pH 1, and $\lambda_{max}$ 270 m$\mu$ at pH 13.

The picrate of the crystalline material melted at 146–147° C., and an elementary analysis of the picrate had the following results: Found (percent): C, 40.02; H, 4.35; N, 15.37. Calculated for $C_{21}H_{23}O_{15}N_9 \cdot H_2O$ (percent): C, 39.94; H, 3.99; N, 15.53.

Example 2

Preparation of Ip-AcO-AICAR.—A mixture of 29.8 g. Ip-AICAR, 13.3 g. anhydride, 19.8 g. tri-n-butylamine and 50 ml. chloroform was stirred at 50° C. for 4 hours. The reaction mixture was evaporated under reduced pressure, the syrup obtained was purified in the same way as in Example 1, and a purified syrup of Ip-AcO-AICAR was obtained. The pure crystalline picrate of Ip-AcO-AICAR melted at 138–139° C. It was identified by elementary analysis: Found (percent): C, 41.92; H, 4.19; N, 17.23. Calculated for $C_{20}H_{23}O_{13}N_4$ (percent): C, 42.18; H, 4.08; N, 17.22.

Only a single spot of $Rf$ 0.83 was detected on a paper chromatogram of the syrup of Ip-AcO-AICAR.

Ultraviolet absorption of spectra of the syrup showed $\lambda_{max}$ 247 (S) and 270 m$\mu$ at pH 1, and $\lambda_{max}$ 270 m$\mu$ at pH 13.

Example 3

4.0 g. Ip-AICAR was dissolved in 50 ml. pyridine, 2.13 g. p-toluenesulfonyl chloride was added with cooling, and the mixture was left to stand for 7 days. The reaction mixture was treated in the same way as in Example 1, and 2.0 g. pure crystalline Ip-AICNR was obtained as colorless needles, which melted at 188–190° C.

An elementary analysis of the crystals was as follows: Found (percent): S, 51.00; H, 6.23; N. 19.69. Calculated for $C_{12}H_{18}O_4N_4$ (percent): C, 51.42; H, 5.75; N, 19.99.

Ultraviolet absorption spectra of the crystals showed $\lambda_{max}$ 240–2 m$\mu$ in 0.1 N HCl, $\lambda_{max}$ 246 m$\mu$ in ethanol solution, and 248 m$\mu$ in 0.1 N NaOH solution.

The infrared absorption spectrum showed $\lambda_{max}$ 2215 cm.$^{-1}$, which is considered to be due to the bond C≡N.

The $Rf$ value of the paper chromatogram was 0.80 in an n-butanol system.

Example 4

Part A: Preparation of Tri-AcO-AICNR.—19.2 g. Tri-AcO-AICAR was dissolved in 140 ml. chloroform, 25.3 g. triethylamine was added, and the mixture was stirred while being cooled with ice. A solution of 7.18 g. phosphoryl chloride in 45 ml. chloroform was added to the above mixture dropwise over 3 hours, the mixture was stirred further for one and one-half hours, and the reaction mixture was poured onto 50 ml. ice-water. The chloroform layer obtained was washed twice with 50 ml. water, 50 ml. 0.01 N HCl and 25 ml. water. The chloroform layer was dried with anhydrous disodium sulfate, the chloroform was evaporated, and 12.9 g. Tri-AcO-AICNR was obtained as a colorless syrup with a yield of 71%. The syrup was purified by column chromatography on alumina with ethyl acetate as a solvent.

An elementary analysis of the purified syrup was as follows: Found (percent): C, 48.91; H, 4.73; N, 15.44. Calculated for $C_{15}H_{18}O_7N_4$ (percent): C, 49.18; H, 4.95; N, 15.30.

Tri-AcO-AICNR had the following properties:

(1) Colorless syrup
(2) $Rf$=0.89 in a solvent as above (3) $\lambda_{max.}^{pH\,1}=242$ m$\mu$, $\lambda_{max.}^{pH\,13}=248$ m$\mu$ Part B: Preparation of AICNR.—6.5 g. Tri-AcO-AICNR was dissolved in a mixture of 15 ml. conc. ammonia water and 15 ml. methanol, and the solution was stirred at room temperature for 5 hours. The reaction mixture was concentrated under reduced pressure, the residue obtained was recrystallized from water, and the pure crystalline AICNR obtained weighed 3.92 g. (91.6%) and melted at 207.5–208° C.

It was identified by elementary analysis: Found (percent): C, 45.32; H, 5.15; N, 23.21. Calculated for $C_9H_{12}O_4N_4$ (percent): C, 45.00; H, 5.04; N, 23.33.

Example 5

The crude syrup of Ip-AcO-AICAR obtained in Example 2 was dissolved in 200 ml. chloroform, and 40.5 g. triethylamine was added to the solution. A mixture of 15.3 g. phosphoryl chloride and 85 ml. chloroform was added dropwise with stirring and cooling over 3 hours, the reaction solution was further stirred for two and one half hours, and then shaken with 100 ml. water. The chloroform layer was washed twice with 50 ml. water, dried with anhydrous disodium sulfate, and the chloroform was evaporated. 30 ml. benzene was added to the residues obtained to precipitate crystals which were recrystallized from ethyl acetate. The pure crystalline Ip-AcO-AICNR weighed 20.9 g. (65%), and melted at 138.5–139° C.

An elementary analysis of the crystals was as follows: Found (percent): C, 52.19; H, 5.53; N, 17.46. Calculated for $C_{14}H_{18}O_5N_4$ (percent): C, 52.17; H, 5.63; N, 17.32.

Example 6

1.92 g. Tri-AcO-AICAR was dissolved in 8 ml. pyridine, 1.43 g. p-toluenesulfonyl chloride was added with cooling, and the mixture was stirred for 10 hours at 50° C. The reaction mixture was poured onto 50 ml. ice-water, and the end product was extracted with 30 ml. chloroform from the aqueous solution. The ultraviolet absorption spectrum of the chloroform layer and a spot on a paper chromatogram of the layer which was developed with n-butanol agreed with those of Tri-AcO-AICNR obtained in Example 4. Tri-AcO-AICNR was found to be produced in a yield of 67% by measuring the ultraviolet absorption.

Example 7

Ip-AcO-AICAR prepared from 2.98 g. Ip-AICAR in the same way as in Example 2 was dissolved in 20 ml. tri-n-butylamine, and 0.785 g. acetylchloride was added dropwise over 30 minutes with cooling. The reaction mixture was poured onto 50 ml. ice-water, a chloroform layer obtained was washed twice with 20 ml. water, and after drying with disodium sulfate, the chloroform was evaporated. The residue obtained was recrystallized twice from ethylacetate, and 1.09 g. pure crystalline Ip-AcO-AICNR was obtained in a yield of 34%. The crystals melted at 138–139° C.

Example 8

30 ml. ethanol saturated with gaseous ammonia was added to a mixture of 1.4 g. Ip-AICNR and 8.2 ml. ethyl orthoformate, the mixture was held at 150° C. for 6 hours in a sealed tube, and ethanol was evaporated from the reaction mixture. The black residue was extracted with 50 ml. water with heating, precipitates were removed by filtration, and the mother liquor was concentrated to about 10 ml. to precipitate crude crystalline 2′,3′-O-isopropylideneadenosine which was treated with active charcoal, and the pure crystals obtained were colorless needles, which weighed 1.03 g. (69%) and melted at 217–218° C.

A mixture of the crystals with 2′,3′-O-isopropylideneadenosine which had been prepared from adenosine with acetone did not show a lowered melting point. The Rf values, ultraviolet and infrared absorption spectra completely agreed with those of the 2′,3′-O-isopropylideneadenosine prepared above.

Example 9

A mixture of 4.48 g. Ip-AICNR and 20 ml. ethyl orthoformate was refluxed for 3 hours on an oil bath of 130° C., unreacted ethyl orthoformate was evaporated, and the syrup was obtained. The syrup was dissolved in 40 ml. ethanol, gaseous ammonia was introduced to saturate the ethanol solution while cooling with water, and the mixture was held at room temperature for 3 hours.

Ethanol was evaporated from the reaction mixture, the colorless syrup obtained was dissolved in a mixture of 10 ml. methanol and 10 ml. water, and the solution was stirred at pH 3 for 3 hours at room temperature. The solution was adjusted to pH 10–11 with 4 N NaOH solution, and stirred for one hour to precipitate colorless crystals which weighed 3.73 g. and melted at 212–216.5° C. The mother liquor was concentrated to precipitate a second crop of crystals which weighed 0.84 g. and melted at 218–219° C. The first and second crops of 2′,3′-O-isopropylideneadenosine represented a yield of 93%. They were crystallized from water, and the pure crystals obtained melted at 218–219° C. Their properties completely agreed with those of 2′3′-O-isopropylideneadenosine as prepared in Example 8 as to the mixed melting point, Rf values, and ultraviolet and infrared absorption spectra.

Example 10

A mixture of 2.80 g. Ip-AICNR and 10 ml. methyl orthoformate was held at 160° C. for 4 hours in a sealed tube. Unreacted methyl orthoformate was evaporated, the residue was reacted with ammonia in the same way as in Example 6, and crude crystalline 2′,3′-O-isopropylideneadenosine was obtained. It weighed 2.73 g. (88.6%), and melted at 215–216° C.

Example 11

A mixture of 2.80 g. Ip–AICNR and 10 ml. ethyl orthoformate was refluxed for one and one half hours, unreacted ethyl orthoformate was evaporated under reduced pressure, and the residue obtained was dissolved in 5 ml. methanol. 5 ml. conc. ammonia water was added, and the mixture was stirred to initiate an exothermic reaction. The reaction mixture was left to stand for three hours at room temperature, and then evaporated until neutral. Crystals identified as 2′,3′-O-isopropylidene-5′-diethoxymehyl-adenosine by their N.M.R. spectrum and by elementary analysis precipitated around the flask. The concentrate and the crystals were dissolved in a mixture of 5 ml. methanol and 2 ml. water, the pH of the solution was adjusted to 3 with 6 N HCl, and the solution was stirred for 15 minutes. The solution was adjusted to pH 10–11 with 4 N NaOH, and stirred for 30 minutes to precipitate colorless crystals of 2′,3′-O-isopropylideneadenosine which weighed 2.76 g. (89.6%), and melted at 215–216° C. The crude crystals were recrystallized from methanol, and pure crystals of melting point 217–218° C. The crude crystals were recrystallized from methanol, and pure crystals of melting point 217–218° C. were obtained.

Example 12

A mixture of 2.8 g. Ip–AICNR and 5 ml. formamide was held at 160° C. for three hours in a sealed tube. 2′,3′-O-isopropylideneadenosine was found in the reaction mixture by paper chromatography. Unreacted formamide was distilled off under reduced pressure, the solids obtained were recrystallized from water, and 1.42 g. (46.2%) pure crystalline 2′,3′-O-isopropylideneadenosine was obtained. M.P. 217–218° C.

Example 13

A mixture of 480 mg. AICNR and 20 ml. ethyl orthoformate was refluxed for 6 hours. The reaction mixture was concentrated under reduced pressure to a syrup to which 20 ml. ethanol saturated with ammonia was added. The mixture was kept to stand overnight, the reaction mixture was concentrated, and the residue was dissolved in 3 ml. of 50% aqueous methanol. The solution was stirred at room temperature for 30° C. at pH 3 to remove the diethoxymethyl groups from the 2′,3′- and 5′ positions, and the solution obtained was adjusted to pH 8.0 to precipitate crystals. The crystals obtained by filtration were recrystallized from water, dried with phosphorus pentoxide at a reduced pressure for 24 hours, and 304 mg. pure crystals of adenosine was obtained (57% yield, M.P. 233–234° C.).

Example 14

A mixture of 1.61 g. Ip–AICNR and 10 ml. ethyl orthoformate was refluxed for one hour . The reaction mixture was concentrated to about 4 ml. in one hour at atmospheric pressure, and the residual ethyl orthoformate was distilled off under diminished pressure. The syrup so obtained was dissolved in a mixture of 2 ml. methanol and 2 ml. conc. ammonia, and the mixture was left to stand overnight. Crystals precipitated and were recrystallized from methanol. The pure crystalline 2′,3′-O-isopropylideneadenosine obtained weighed 1.24 g. (81% yield, M.P. 218–219° C.).

Example 15

A mixture of 18.7 g. Tri-AcO-AICNR and 45 ml. ethyl orthoformate was heated to 135° C. for one hour on an oil bath. Unreacted ethyl orthoformate was removed by evaporation at reduced pressure, 20 ml. ethanol saturated with ammonia was added to the residue, and the mixture was heated to 80° C. for two hours in a sealed tube. After cooling, crystals were recovered by filtration, recrystallized twice from water, and dried with phosphorus pentoxide at a reduced pressure. Adenosine was obtained as 9.4 g. pure crystals (70% yield).

What is claimed is:

1. A method of synthesizing adenosine or 2',3'-O-isopropylideneadenosine, which comprises reacting an imidazole derivative selected from the group consisting of 5 - amino - 4 - cyano - 1 - β - D - ribofuranosylimidazole, 5-amino - 4 - cyano - 1 - (2',3'-O-isopropylidene-β - D - ribofuranosyl)imidazole, 5 - amino - 4 - cyano - 1- (2',3' - O - isopropylidene-5'-O-acetyl-β-D-ribofuranosyl) imidazole and 5-amino - 4 - cyano-1-(2',3',5'-tri-O-acetyl-β-D-ribofuranosyl)imidazole with formamide or with a lower alkyl orthoformate and ammonia until a pyrimidine ring is closed.

2. A method as set forth in claim 1, wherein said imidazole derivative is reacted with said lower alkyl orthoformate until a 4 - cyano - 5 - lower alkoxymethyleneaminoimidazoleribofuranoside is formed, and said 4-cyano - 5 - lower alkoxymethyleneaminoimidazoleribofuranoside is reacted with ammonia until said pyrimidine ring is closed.

3. A method of synthesizing 5-amino-4-cyano-1-(2',3', 5'-tri-O-acetyl-β-D-ribofuranosyl) imidazole or 5-amino-4-cyano - 1 - (2',3' - O - isopropylidene - 5' - O - acetyl-β-D-ribofuranosyl)imidazole, which comprises reacting 5-amino - 4 - carbamoyl - 1 - (2',3',5' - tri - O - acetyl - β-D - ribofuranosyl)imidazole or 5 - amino - 4 - carbamoyl-1 - (2',3' - O - isopropylidene - 5' - O - acetyl)imidazole with a dehydrating agent in the presence of an organic base.

4. A method as set forth in claim 3, wherein said dehydrating agent is an acyl chloride and said organic base is a tri-lower-alkylamine, pyridine, or a lower-alkyl pyridine homolog.

5. A method of synthesizing adenosine or 2',3'-O-isopropyleneadenosine, which comprises reacting 5-amino-4 - carbamoyl - 1 - (2',3',5' - tri - O - acetyl - β - D-ribofuranosyl)imidazole or 5 - amino - 4 - carbamoyl - 1- (2',3' - O - isopropylidene - 5' - O - acetyl - β - D-ribofuranosyl)imidazole with a dehydrating agent in the presence of an organic base until an imidazole derivative selected from the group consisting of 5-amino-4-cyano-1- (2',3',5' - tri - O - acetyl - β - D - ribofuranosyl)imidazole and 5 - amino - 4 - cyano - 1 - (2',3' - O - isopropylidene-5'-O-acetyl - β - D - ribofuranosyl)imidazole is formed, hydrolyzing said imidazole derivative to 5-amino-4-cyano-1 - β - D - ribofuranosylimidazole or 5 - amino - 4 - cyano-1 - (2',3' - O - isopropylidene - β - D - ribofuranosyl) imidazole, and reacting said 5-amino-4-cyano-1-β-D-ribofuranosylimidazole or 5-amino - 4 - cyano-1-(2',3',O-isopropylidene-β-D-ribofuranosyl)imidazole with formamide or with a lower alkyl orthoformate and ammonia.

6. A method as set forth in claim 5, wherein said dehydrating agent is an acyl chloride or a phosphorus chloride and said organic base is a tri-lower-alkylamine, pyridine, or a lower-alkyl pyridine homolog.

References Cited

UNITED STATES PATENTS 3,332,935   7/1967   Yamazaki et al. ____ 260—211.5
3,337,528   8/1967   Saito et al. _____ 260—211.5

LEWIS GOTTS, *Primary Examiner.*

J. R. BROWN, *Assistant Examiner.*